UNITED STATES PATENT OFFICE.

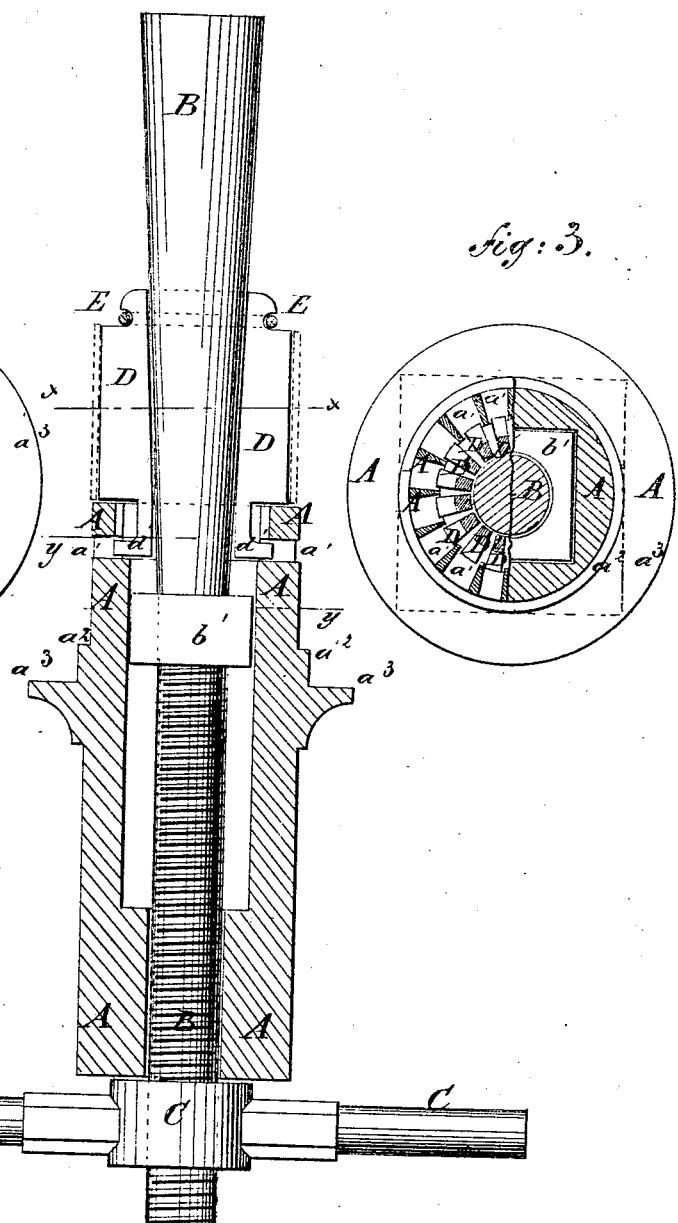

ALANSON WORK, OF PROVIDENCE, RHODE ISLAND.

IMPROVEMENT IN TUBE-EXPANDERS.

Specification forming part of Letters Patent No. 183,241, dated October 10, 1876; application filed May 27, 1876.

*To all whom it may concern:*

Be it known that I, ALANSON WORK, of Providence, in the county of Providence and State of Rhode Island, have invented a new and useful Improvement in Expanding-Tool, of which the following is a specification:

Figure 1 is a longitudinal section of my improved expanding-tool. Fig. 2 is a cross-section of the same, taken through the line $x\,x$, Fig. 1. Fig. 3 is a cross-section of the same, taken through the line $y\,y$, Fig. 1.

Similar letters of reference indicate corresponding parts.

The invention relates to a tool for expanding hose-couplings and applying them to the ends of sections of hose. The improvements relate to the construction of the spindle by which the expansion is primarily effected; also, the construction of the cylindrical body of the tool, and the loose adjustable segments combined therewith; and to the construction of the tool as a whole, all as hereinafter described.

A represents the body of the tool, which is perforated longitudinally to receive the spindle B, the rear part of said perforation being made square to receive a square collar, $b'$, formed upon the middle part of said spindle, to keep it from turning in the said body A. The spindle B may be kept from turning by a groove cut in its forward part, to receive a tongue upon the inner surface of the body A, and by other means. The manner first described is preferred, as being simple and effective, and as not weakening any of the parts.

The forward part of the spindle B is cylindrical, and has a screw-thread cut in it to receive the lever-nut C, by which it is drawn forward, and which rests against the forward end of the body A. The rear part of the spindle B is made conical, or flares from the collar $b'$ to the rearward, as shown in Fig. 1. D are sixteen, more or less, segments, which are arranged radially around the spindle B, and their inner edges are inclined, to correspond with the incline or flare of the rear part of the said spindle B, so that the outer edges of said segments may be parallel with the axis of said spindle. The outer edges of the segments D are rounded off laterally, so that all parts of said outer edges may be equally distant from the axis of the spindle, and may thus form a skeleton cylinder. The forward ends of the segments D have hooks $d'$ formed upon them to hook into radial mortises $a'$, formed in the rear end of the body A, to keep the said segments always equally distant from each other, and thus prevent them from huddling or getting closer together in one place than in another. The same thing may be accomplished by hooking the ends of the segments D into links set in longitudinal grooves in the ends of the body A, and strung upon a wire set in a ring-groove in said body, and in other ways.

The outer or rear ends of the segments D have hooks, notches, or grooves formed in them to receive a rubber ring, E, to hold them against the spindle, as the said spindle is withdrawn after expanding the tube.

The forward ends of the segments D may also be held against the spindle B by a rubber band, if desired. In this case the retaining-hook may be omitted.

The copper tube to be expanded is placed upon the segments D, with its forward end resting against the end of the body A. Upon the rear part of the body A, at the proper distance from its end, is formed a shoulder, $a^2$, for the end of the male part of the coupling to rest against, and a second shoulder, $a^3$, for the end of the female part of the coupling to rest against.

The various parts of the couplings and of the tool are all made to a gage, so that the arrangement herein described will always bring the copper tube to the proper place within the parts of the coupling.

Having thus described my invention, I claim as new and desire to secure by Letters Patent—

1. The combination of the body A, nut C, the spindle having cylindrical screw-threaded part and the smooth tapered portion, and the intermediate collar $b'$, as shown and described, to operate as specified.

2. The combination, with the body A, having the radial slots $a^1$, of the segments D, having hooks $d'$, as shown and described, whereby the segments are separately maintained in a position radial to the spindle, as specified.

3. An expanding-tool formed by the combination of the body A, perforated longitudinally, and provided with the shoulders $a^2$ $a^3$, the spindle B, made conical at one end, having a screw-thread cut upon its other end, and provided with a square collar, the lever-nut C, the fine segments D, and the rubber band or bands E, with each other, substantially as herein shown and described.

ALANSON WORK.

Witnesses:
JOHN C. PURKIS,
THOS. A. MILLETT.